US008341577B1

(12) United States Patent
Korobkov et al.

(10) Patent No.: US 8,341,577 B1

(45) Date of Patent: Dec. 25, 2012

(54) PARALLEL CIRCUIT SIMULATION WITH PARTITIONS

(75) Inventors: Alexander Korobkov, San Jose, CA (US); Subramanian Venkateswaran, Santa Clara, CA (US); Wai Chung W. Au, San Jose, CA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/191,603

(22) Filed: Jul. 27, 2011

(51) Int. Cl.
*G06F 9/455* (2006.01)
*G06F 17/50* (2006.01)

(52) U.S. Cl. ........ 716/113; 716/104; 716/105; 716/108; 716/112; 716/134; 703/19

(58) Field of Classification Search .................. 716/108, 716/113, 104, 105, 112, 134; 703/19
See application file for complete search history.

(56) References Cited

U.S. PATENT DOCUMENTS 6,557,158 B1 * 4/2003 Nishida ......................... 716/104
7,907,456 B2 * 3/2011 Houston et al. .......... 365/189.09
2009/0055780 A1 * 2/2009 Acar et al. ........................ 716/2
2009/0106717 A1 * 4/2009 Chen et al. ........................ 716/6
2011/0072404 A1 * 3/2011 Srinivas ........................ 716/108

OTHER PUBLICATIONS

"Methods to Enhance the Performance of Iterated Timing Analysis Algorithm", by Chung-Jung, Bin-Cheng Chen, Chih-Jen Lee, Chang-Lung Tai, Li-Ping Chou, and Allen Y. Chang, @2010 IEEE.*
Newton, Arthur R., et al., "Relaxation-Based Electrical Simulation," IEEE Transactions on Electron Devices, vol. Ed-30, No. 9, Sep. 1983.
Peng, He, et al., "Parallel Transistor Level Full-Chip Circuit Simulation," Apr. 20-04, 2009, pp. 304-307, 1530-1591; ISBN 978-1-4244-3781-8.
Dong, Wei, et al., "Parallelizable Stable Explicit Numerical Integration for Efficient Circuit Simulation," IEEE Xplore, pp. 382-385, Jul. 26-31, 2009, ISBN 978-1-6055-8797-3.
Forenc, Jaroslaw, "time Domain Decomposition in Parallel Analysis of Transient States," Proceedings of the International Symposium on Parallel computing in Electrical Engineering (PARELEC'06) IEEE Computer Society, Jul. 2006.
Zhou, Xiaowei, et al., "DCCB and SCC Based Fast Circuit Partition Algorithm for Parallel SPICE Simulation," IEEE, Sep. 2009; 978-1-4244-3870.

* cited by examiner

*Primary Examiner* — Nha T Nguyen
(74) *Attorney, Agent, or Firm* — Marsh Fischmann & Breyfogle LLP; Daniel J. Sherwinter

(57) ABSTRACT

Embodiments of the invention provide systems and methods for parallelizing simulation of circuit partitions. A circuit is divided into a number of partitions, for example, according to channel-connected regions. In some embodiments, the partitions are sequenced and assigned to multiple threads for parallel analysis. Iterative timing analysis (ITA), or some other form of analysis, is performed on the partitions over a series of integration time steps. Using the multiple threads, some partitions are solved at later integration time steps while the ITA continues toward relaxation convergence for a current integration time step.

10 Claims, 10 Drawing Sheets

600

604 Partition a circuit into a plurality of circuit partitions

608 Calculate a first dependency indicating that an initial condition of a second circuit partition at a given integration time depends on a solved condition of a first circuit partition according to conditions of a previous integration time 612 Calculate a second dependency indicating that an initial condition of the first circuit partition at the given integration time does not depend on a solved condition of the second circuit partition according to conditions of the previous integration time 616 Calculate a second solved condition of the first circuit partition according to predicted conditions of the second integration time while performing an iterative timing analysis of the circuit with the computer-implemented circuit simulator according to conditions of a first integration time, the iterative timing analysis comprising calculating a first solved condition of the second circuit partition as a function of a first solved condition of the first circuit partition calculated according to conditions of the first integration time

PARALLEL CIRCUIT SIMULATION WITH PARTITIONS

FIELD

Embodiments of the present invention relate generally to circuit simulation, and, more particularly, to parallelization of circuit partition simulation.

BACKGROUND

Circuit simulation is one of the most computationally expensive procedures among various design analysis methodologies and techniques, especially when a transistor level circuit with a large number of devices is being analyzed. Recent advances in design and process technology, including increases in computational power, have allowed new and previously unworkable techniques to be used to attack these large scale tasks. Advanced simulation techniques like circuit partitioning were designed to improve the transient analysis run time, while keep accuracy degradation fairly small.

Typically, the number of partitions relates to the number and types of components, the circuit topology, available computing resources, etc. As the number of partitions become very large (e.g., as the circuit size becomes very large), the simulation times may become undesirably long. Thus, it may be desirable to provide techniques for reducing circuit simulation times while preserving simulation accuracy.

BRIEF SUMMARY

Among other things, systems and methods are described for parallelizing simulation of circuit partitions. A circuit is divided into a number of partitions, for example, according to channel-connected regions. In some embodiments, the partitions are sequenced and assigned to multiple threads for parallel analysis. Iterative timing analysis (ITA), or some other form of analysis, is performed on the partitions over a series of integration time steps. Using the multiple threads, some partitions are solved at later integration time steps while the ITA continues toward relaxation convergence for a current integration time step.

According to one set of embodiments, methods and computer program products are provided for performing various steps to simulate a circuit partitioned into a number of circuit partitions over a number of integration times. The steps include: calculating a first dependency indicating that an initial condition of a second circuit partition at a given integration time depends on a solved condition of a first circuit partition according to conditions of a previous integration time; calculating a second dependency indicating that an initial condition of the first circuit partition at the given integration time does not depend on a solved condition of the second circuit partition according to conditions of the previous integration time; and calculating a second solved condition of the first circuit partition according to predicted conditions of the second integration time while performing an iterative timing analysis of the circuit with the computer-implemented circuit simulator according to conditions of a first integration time, the iterative timing analysis including calculating a first solved condition of the second circuit partition as a function of a first solved condition of the first circuit partition calculated according to conditions of the first integration time.

According to another set of embodiments, a computer-implemented circuit simulation system is provided. The system includes a partitioning module, an iterative timing analysis module, and a parallelization module. The partitioning module is configured to partition a circuit into a plurality of circuit partitions. The iterative timing analysis module is configured to perform an iterative timing analysis of the circuit according to the circuit partitions, for each integration time, the iterative timing analysis comprising iteratively calculating solved conditions for at least some of the circuit partitions according to conditions of the integration time until a convergence threshold is reached. The parallelization module is in communication with the iterative timing analysis module and is configured to: calculate a first dependency indicating that an initial condition of a second circuit partition at a given integration time depends on a solved condition of a first circuit partition according to conditions of a previous integration time; calculate a second dependency indicating that an initial condition of the first circuit partition at the given integration time does not depend on a solved condition of the second circuit partition according to conditions of the previous integration time; and calculate a second solved condition of the first circuit partition according to predicted conditions of the second integration time in parallel with the iterative timing analysis module performing an iterative timing analysis of the circuit according to conditions of a first integration time, the iterative timing analysis of the circuit according to conditions of the first integration time comprising calculating a first solved condition of the second circuit partition as a function of a first solved condition of the first circuit partition calculated according to conditions of the first integration time.

BRIEF DESCRIPTION OF THE DRAWINGS

The present disclosure is described in conjunction with the appended figures.

Figure 1:
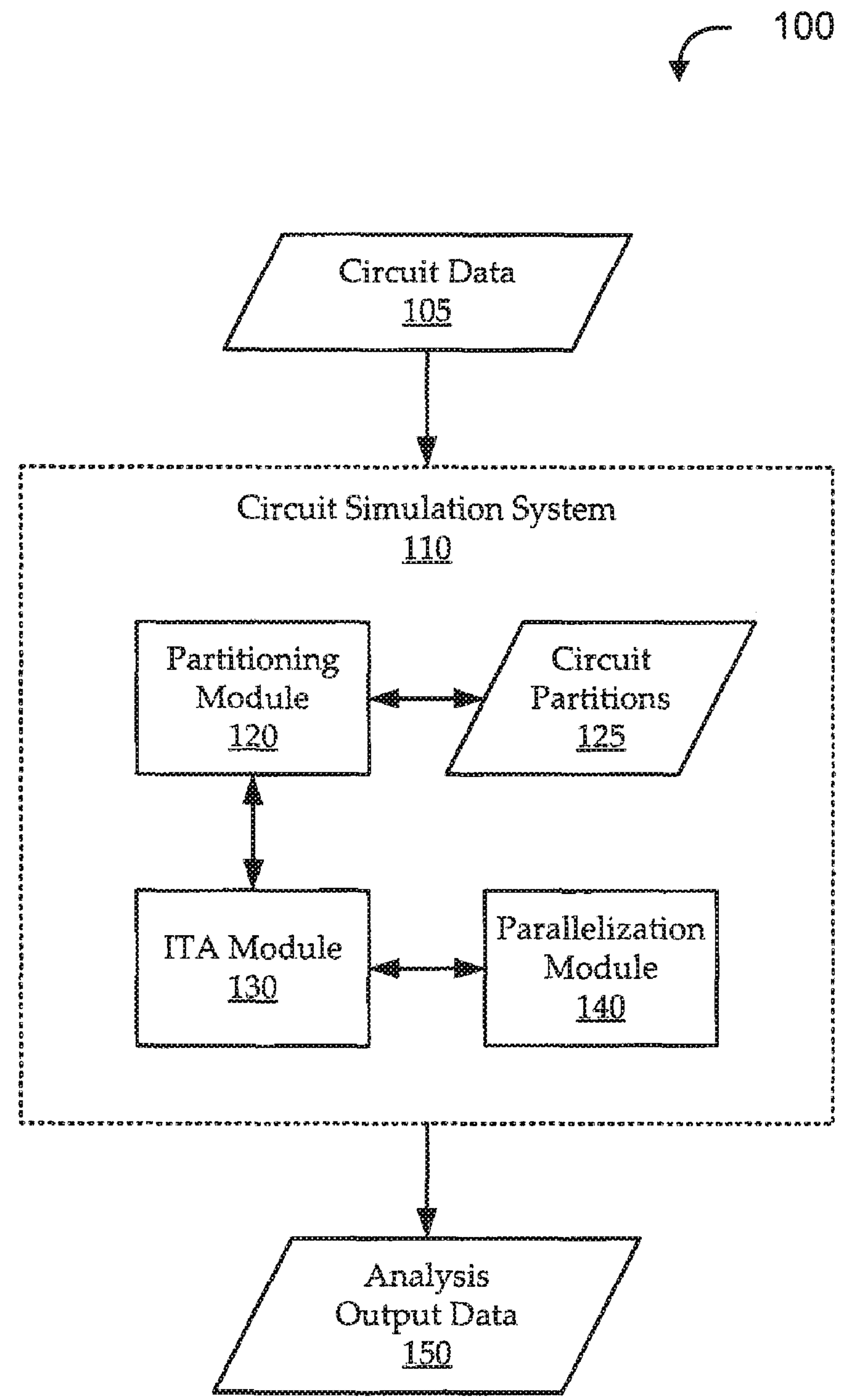
FIG. 1 shows a block diagram of an illustrative circuit simulation system, according to various embodiments.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Typically, part of the design cycle for circuits (particularly complex and/or large-scale circuits) involves circuit simulation. Circuit simulation is one of the most computationally expensive procedures among various design analysis methodologies and techniques, especially when a transistor level circuit with a large number of devices is being analyzed. Recent advances in design and process technology, including increases in computational power, have allowed new and previously unworkable techniques to be used to attack these large scale tasks. Advanced simulation techniques like circuit partitioning were designed to improve the transient analysis run time, while keeping accuracy degradation fairly small.

Iterative Timing Analysis (ITA) is an advanced simulation method widely used in combination with circuit partitioning, in which transistor (e.g., typically MOSFET) dominated circuits are decomposed into circuit partitions according to their channel-connected regions. Iterations are performed on the circuit partitions at each of a sequence of analysis times (called "integration time steps" herein) in a certain order, until a convergence is reached. Within each integration time step, the circuit partitions may be analyzed using traditional methods. For example, the so-called "Newton-Raphson" method can be used to linearize the set of non-linear equations at a given analysis integration time, and a sparse linear solver can be used to solve the linearized system of equations associated with the circuit partition.

Typically, the number of partitions relates to the number and types of components, the circuit topology, available computing resources, etc. As the number of partitions become very large (e.g., as the circuit size becomes very large), the simulation times may become undesirably long. For example, the long simulation time for circuits having an extremely high degree of connections between hundreds of thousands of MOSFET devices may have a critical impact on the design cycle. Traditionally, limitations of sparse linear solvers made it impractical or impossible to analyze circuits of such complexity. Accordingly, some traditional approaches require reduction of the circuit prior to processing, likely resulting in a modest loss of accuracy.

Recent advances in computational architectures have opened up new possibilities for multi-threading. For example, many newer central processing unit (CPU) designs include support for running multiple parallel hardware threads, multiple cores, etc. In the context of multi-threading, multiple techniques are possible for parallelizing circuit simulation procedures. Parallelization can provide more efficient use of computational resources, so that the same number of circuit partitions may be analyzed in parallel with shorter runtimes.

Some techniques include parallelizing internal operations, such as device evaluation or linear equations solving, including using some partitioning algorithms optimized for multi-threading. However, parallelization of the circuit simulation tasks can be difficult for a number of reasons. One reason is that at least some of the tasks are typically dependent on other tasks, such that some sequencing may be required for an accurate solution. For example, certain advantages can be observed when an analysis procedure is split into parallel operations on a top level of a simulation stack (e.g., the time domain integration procedure). However, the sequential nature of the top level tasks may frustrate attempts at parallelization.

While certain approaches have been suggested for parallelizing analysis of circuit partitions, these approaches have been limited in various ways. For example, some such approaches are limited to parallelizing only independent events. Other such approaches are limited to parallelization within a single tier of a hierarchical partitioning scheme. Still other approaches fail to scale to large numbers of parallel processes or fail to handle fast-switching or arbitrary-switching signals.

According to some embodiments described herein, the results of partition analyses for a current integration time step can be used for a subsequent integration time step analysis, while remaining partitions are still scheduled to be analyzed at the current integration time step. In some cases, certain partitions are analyzed multiple times in the same integration time step until a relaxation convergence criteria is satisfied. Accordingly, it may be important to save each partition solution for future reuse. Analysis at a next integration time step can be repeatedly performed on a partition if solution at a given integration time step has been modified (e.g., upon a failed verification of a solution or condition).

Turning first to FIG. 1, a block diagram is shown of an illustrative circuit simulation system 100, according to various embodiments. As illustrated, a circuit is described as a set of circuit data 105 (e.g., according to a standard, dedicated, or proprietary circuit description language). The circuit data 105 is passed to a circuit simulation system 110 for analysis, which uses a number of functional blocks to generate and output analysis output data 150. The functional blocks may include a partitioning module 120, an ITA module 130, and a parallelization module 140.

The partitioning module 120 uses the circuit data 105 to generate a set of circuit partitions 125. In some embodiments, the partitioning module 120 decomposes the circuit into circuit partitions 125 according to channel-connected regions. For example, the circuit may be partitioned at the gates of identified MOSFET (or similar) devices, where it is assumed that no large currents are flowing into those devices. In other embodiments, tiered techniques are used to generate circuit partitions 125 based on hierarchies. Other embodiments may use other partitioning techniques.

It will be appreciated that various techniques are used for optimization of circuit partitioning. These techniques may base the partitioning on the number of circuit components, the types of circuit components, the circuit topology (e.g., the numbers, types, and complexity of connections between the circuit components), availability of computational resources (e.g., availability, of memory, multi-threading capability, etc.), etc. Some techniques optimize the partitioning to balance runtime and analysis error against numbers of circuit partitions 125. For example, a single partition for the entire circuit may be the most complex partition to process, but it may also result in the least number of iterations and the lowest chance of inaccuracies due to the partitioning process. On the other hand, partitioning into millions of partitions may cause each partition to be relatively simple to calculate, but it may also result in undesirably large numbers of iterations and a higher potential for analysis error due to the partitioning process.

For the sake of simplicity, the embodiments described herein focus on ITA of circuit partitions 125 generated according to channel-connected regions and digital signaling environments. However, similar techniques can be used with other types of circuit partitions 125. Further, similar techniques can be used with circuits involving analog signals, mixed signals, etc.

The circuit partitions 125 are then used by the ITA module 130 to perform an iterative analysis. For example, a sequence is generated for the analysis, and the circuit partitions 125 are analyzed sequentially, according to conditions of each of a set of integration time steps, until a final simulation time is reached. For each integration time step, the circuit partitions 125 are iteratively solved according to conditions of the time step (e.g., values of independent voltage and current sources, previously solved values of the circuit partition 125, solved or predicted values of other circuit partitions 125 on which the circuit partition 125 depends, etc.) until a relaxation convergence is reached. For example, it may be considered that a convergence has been reached when, given one or more stable input conditions, a calculation results in a stable output condition.

As will be described more fully below, embodiments use various techniques to parallelize the analysis of the circuit partitions 125. In some embodiments, the parallelization module 140 determines partition dependencies, sequencing, and/or other characteristics of the analysis and parallelizes analysis of some or all of the partitions. The parallelization may involve solving some of the partitions alongside analyses being performed by the ITA module 130 or directing the ITA module 130 to solve various partitions in parallel. For example, the parallelization module 140 may assign different analysis tasks to different hardware or software threads (e.g., on a single or multiple cores of a CPU) for multi-threaded processing.

Though not shown, each functional block may include memory, or may access memory located elsewhere within or outside the circuit simulation system 110. For example, parallel processing of the ITA tasks may require queuing or partition tasks, intermediate storage of partition solutions, linear and/or non-linear solvers, etc. These and/or other functions may require memory and/or other functionality to be part of the ITA module 130 and/or the parallelization module 140 in certain implementations. In fact, various functions of the circuit simulation system 110 may involve components that are assumed to be included within the functional blocks illustrated in FIG. 1. Accordingly, discussions of particular functionality with reference to a particular functional block are intended only to provide added clarity or context and should not be construed as limiting the scope of embodiments.

It will be appreciated that the circuit simulation system 110 may be implemented in many different ways. For example, the various functional blocks may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each block may also be implemented, in whole or in part, with instructions embodied in a memory, formatted to be executed by one or more general or application-specific processors.

Figure 2:
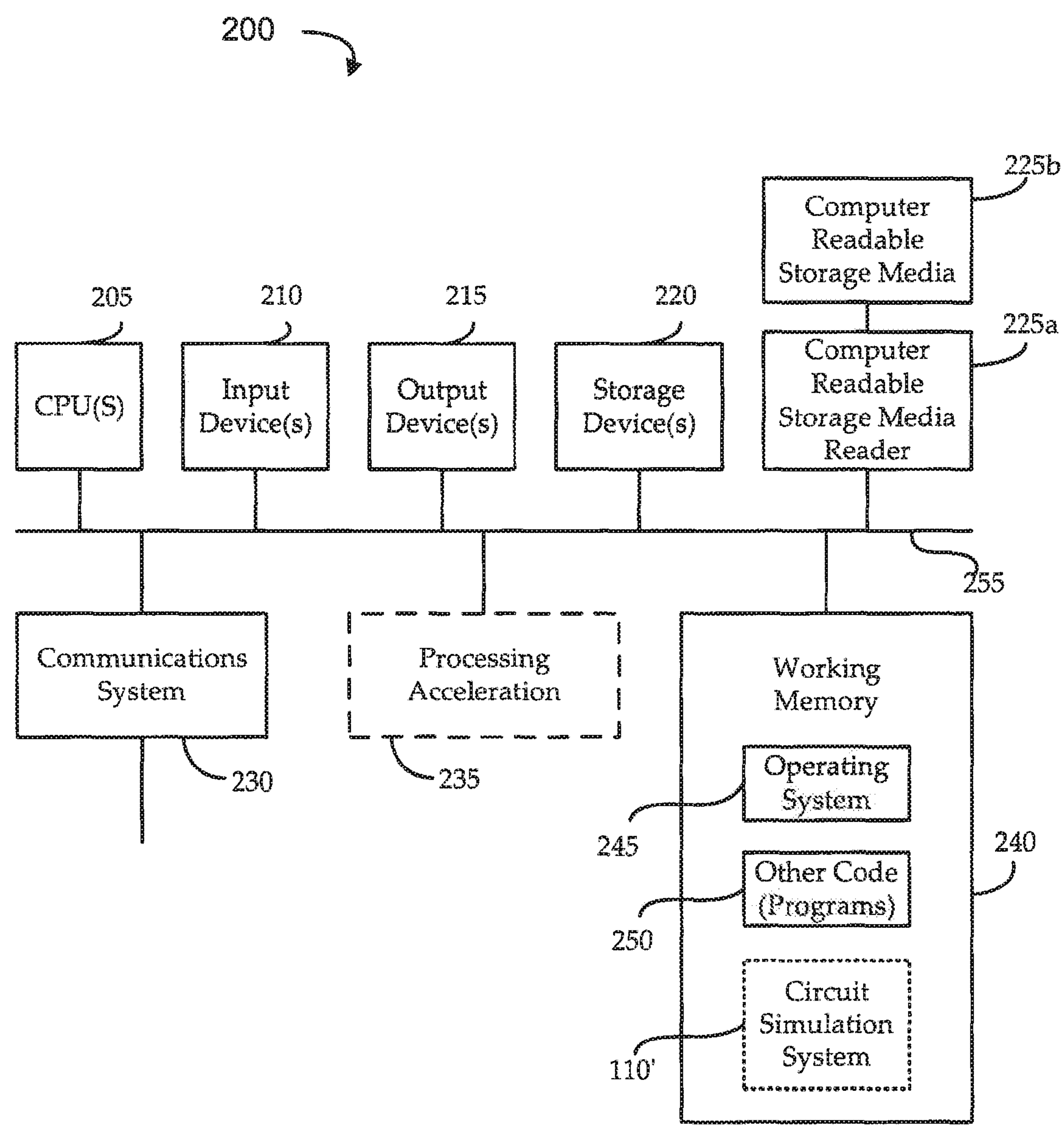
FIG. 2 shows an exemplary computational environment, in the context of which various embodiments may be implemented.

FIG. 2 shows an exemplary computational environment 200, in the context of which various embodiments may be implemented. The computational environment 200 may be implemented as or embodied in single or distributed computer systems, or in any other useful way. The computational environment 200 is shown including hardware elements that may be electrically coupled via a bus 255.

The hardware elements may include one or more central processing units (CPUs) 205, one or more input devices 210 (e.g., a mouse, a keyboard, etc.), and one or more output devices 215 (e.g., a display device, a printer, etc.). The computational environment 200 may also include one or more storage devices 220. By way of example, storage device(s) 220 may be disk drives, optical storage devices, solid-state storage devices such as a random access memory (RAM) and/or a read-only memory (ROM), which can be programmable, flash-updateable, and/or the like.

The computational environment 200 may additionally include a computer-readable storage media reader **225*a*, a communications system 230 (e.g., a modem, a network card (wireless or wired), an infra-red communication device, etc.), and working memory 240, which may include RAM and ROM devices as described above. In some embodiments, the computational environment 200 may also include a processing acceleration unit 235**, which can include a DSP, a special-purpose processor and/or the like.

The computer-readable storage media reader **225*a* can further be connected to a computer-readable storage medium 225*b*, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with a network and/or any other computer described above with respect to the computational environment 200**.

The computational environment 200 may also include software elements, shown as being currently located within a working memory 240, including an operating system 245 and/or other code 250, such as an application program (which may be a client application, web browser, mid-tier application, RDBMS, etc.). For example, as described with reference to FIG. 1, functionality of the circuit simulation system 110' may be implemented as a software product and/or as instructions causing the CPU(s) 205 to perform certain functionality.

In one illustrative implementation, functions of the circuit simulation system 110' are implemented as software code and loaded into working memory 240. Upon execution of the code, ITA computations are performed by the CPU(s) 205 and various data are stored (e.g., on computer readable media, such as storage device(s) 220 or computer readable storage media **225*b***).

It should be appreciated that alternate embodiments of a computational environment 200 may have numerous variations from that described above. For example, customized hardware might also be used and/or particular elements might be implemented in hardware, software (including portable software, such as applets), or both. Further, connection to other computing devices such as network input/output devices may be employed. Software of the computational environment 200 may include code 250 for implementing embodiments of the present invention as described herein.

Figure 3:
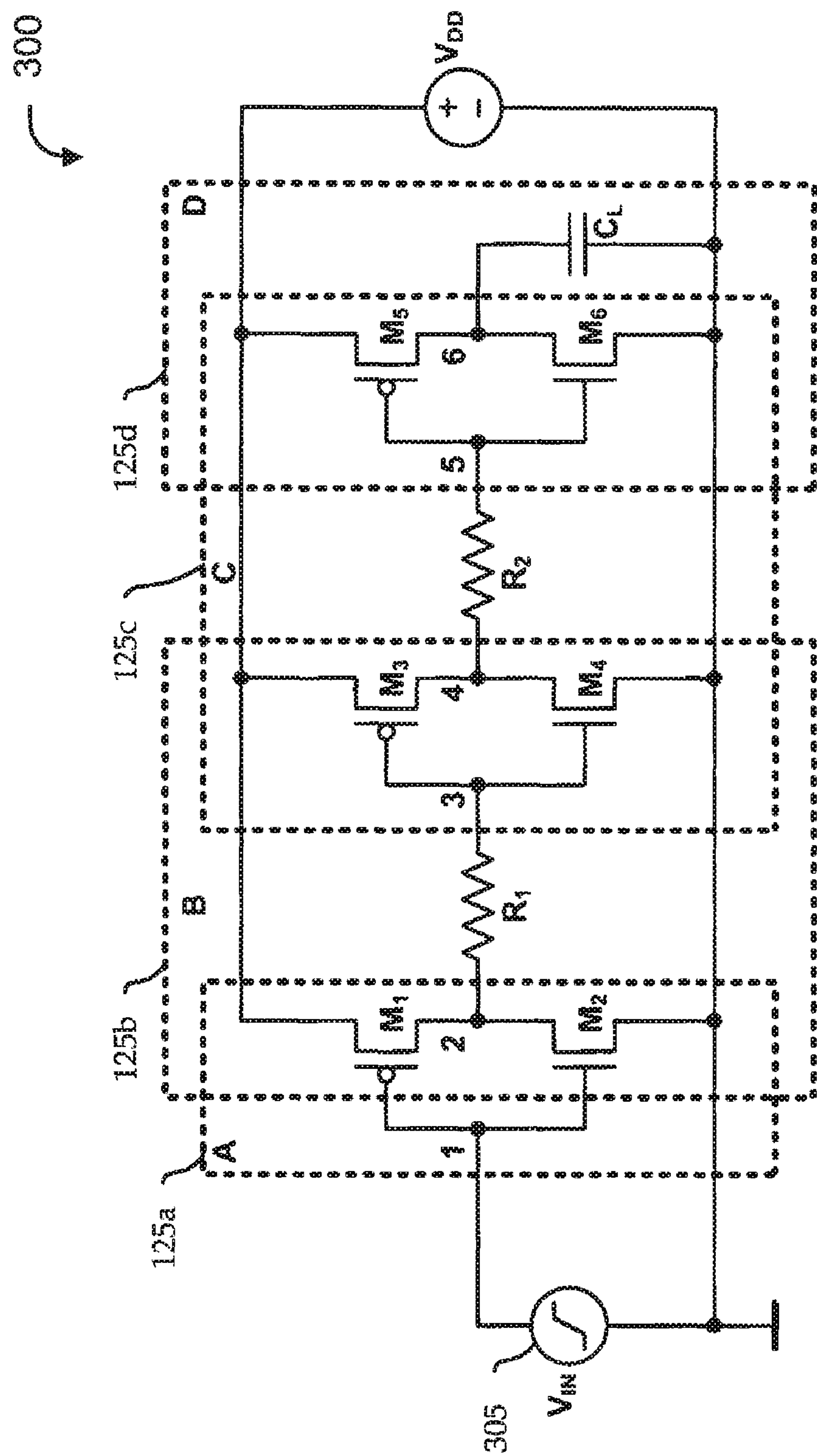
FIG. 3 shows a simple circuit along with four illustrative circuit partitions.

For the sake of illustration, FIG. 3 shows a simple circuit 300 along with four illustrative circuit partitions 125. The circuit partitions 125 have partitioned according to channel-connected regions of the six MOSFET devices in the circuit. At any given integration time, a value of an independent signal source 305 can be determined. That value may be considered in initial condition of a first partition 125*a* from which a solution to the first partition 125*a* can be calculated for that integration time step. The condition by which a second partition 125*b* can be solved for that integration time step may then be based on the solution for the first partition 125*a*. Similarly, the solution for a third partition 125*c* may be based on the solution for the second partition 125*b*, and the solution for a fourth partition 125*d* may be based on the solution for the third partition 125*c*. The circuit 300 provides a context for the timing diagrams of FIGS. 4 and 5.

Figure 4:
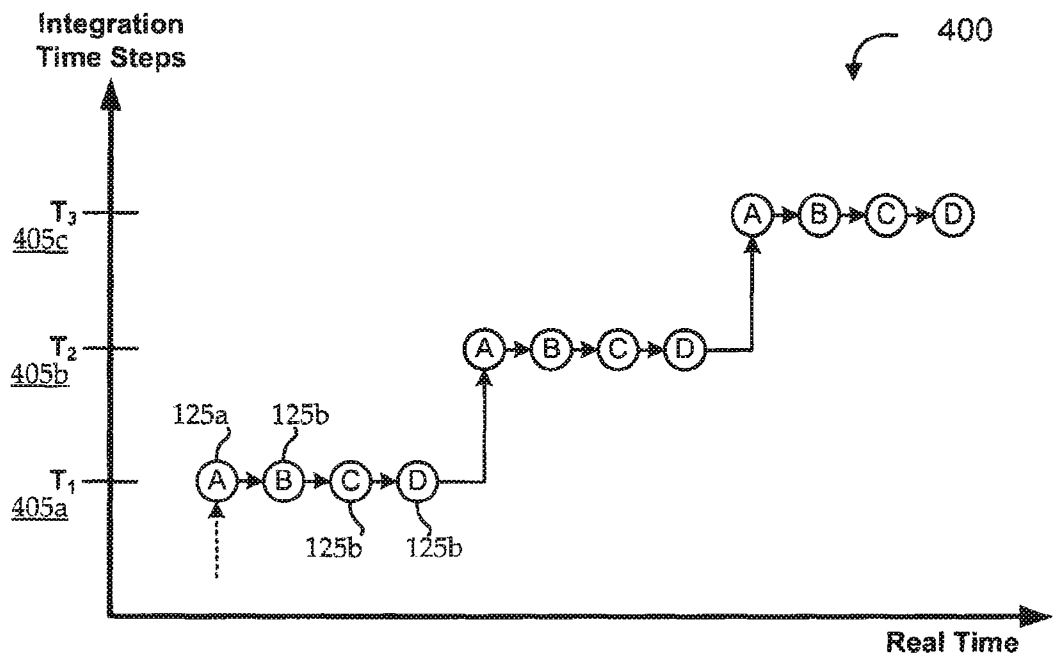
FIG. 4 shows a timing diagram for a traditional simulation of the circuit of FIG. 3, according to some prior art techniques.

FIG. 4 shows a timing diagram 400 for a traditional simulation of the circuit 300 of FIG. 3, according to some prior art techniques. As discussed above, dependencies between the circuit partitions 125 tend toward a sequenced approach. According to ITA techniques, the circuit partitions 125 may be iteratively solved in sequence until a convergence is reached for a given integration time step 405. For example, once the convergence is reached for a first integration time step 405*a*, the final, converged solution can be used as initial conditions for performing ITA on the circuit according to a second integration time step 405*b*.

Figure 5:
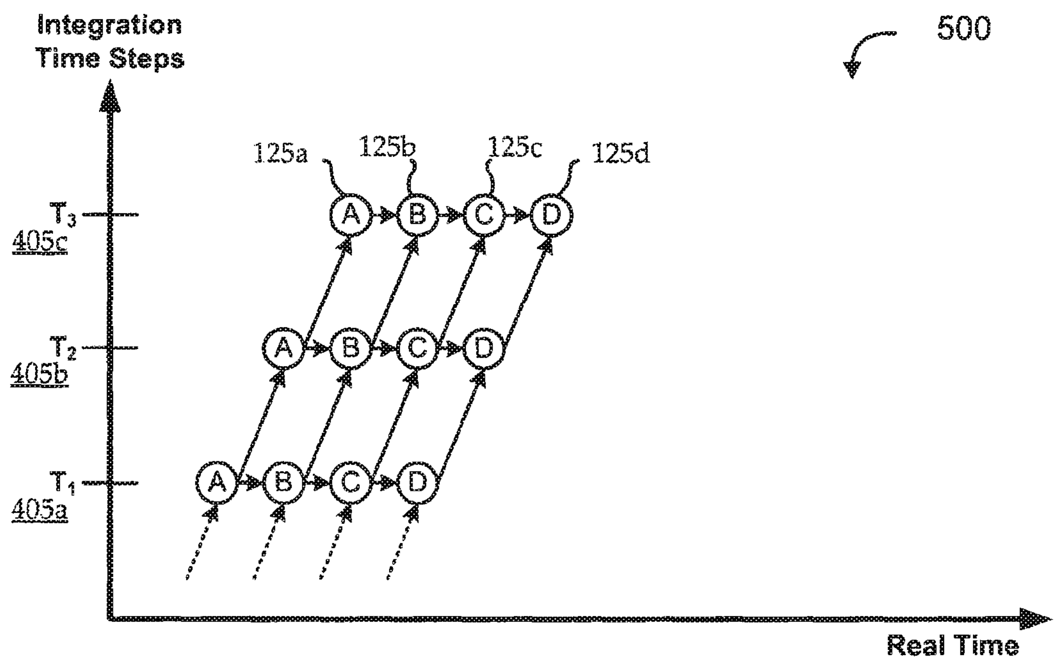
FIG. 5 shows a timing diagram for a parallelized simulation of the circuit of FIG. 3, according to various embodiments.

FIG. 5 shows a timing diagram 500 for a parallelized simulation of the circuit 300 of FIG. 3, according to various embodiments. Again, dependencies between the circuit partitions 125 tend toward a sequenced approach, and ITA techniques are used to iteratively solve the circuit partitions 125 in sequence until a convergence is reached for a given integration time step 405. However, it is determined (e.g., by the parallelization module 140 of FIG. 1) that a solution to a first circuit partition 125*a* at a second integration time step 405*b* depends only on the value of the independent source 305 at that second integration time step 405*b* and on a solution to the first circuit partition 125*a* at a first integration time step 405*a*, and not on solutions at the first integration time step 405*a* to the other circuit partitions (i.e., 125*b*, 125*c*, and 125*d*).

Accordingly, as illustrated, the first circuit partition 125*a* begins to be solved at the second integration time step 405*b* after it is solved at the first integration time step 405*a*, but in parallel with solving other circuit partitions 125 at the first integration time step 405*a*. Similarly, the second circuit partition 125*a* begins to be solved at the second integration time step 405*b* after it is solved at the first integration time step 405*a*, but in parallel with solving other circuit partitions 125 at the first integration time step 405*a*, and so on. Notably, as subsequent circuit partitions 125 are solved and/or as each integration time step 405 completes, the initial conditions and/or final conditions of some or all of the circuit partitions 125 for subsequent integration time steps 405 can be verified, recalculated, etc., as desired or needed. In some embodiments, the parallelization of the ITA tasks involves assigning the tasks to multiple threads for parallel processing.

Figure 6:
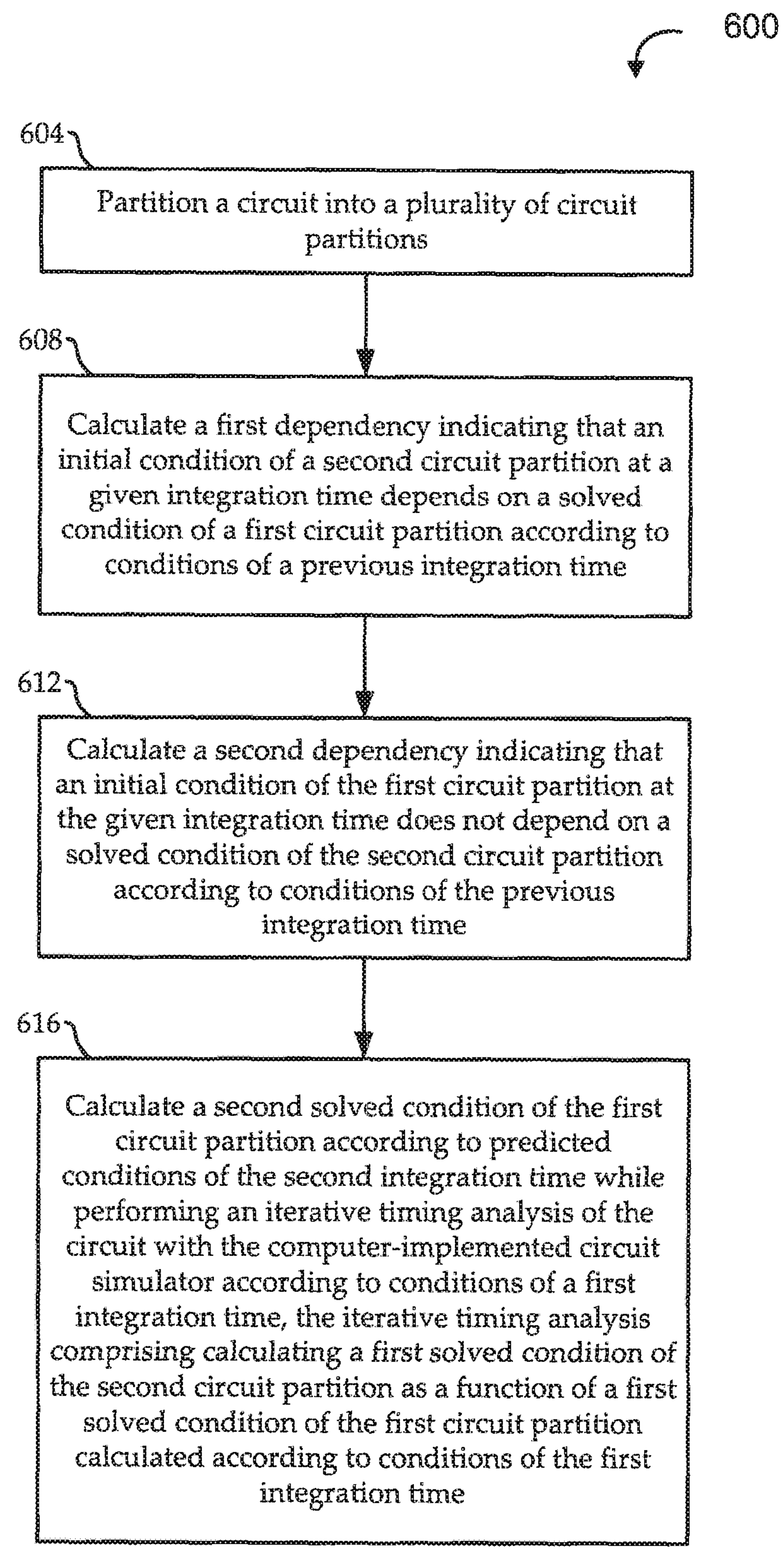
FIG. 6 shows a flow diagram of an illustrative method for parallelizing ITA tasks for simulating circuit partitions, according to various embodiments.

FIG. 6 shows a flow diagram of an illustrative method 600 for parallelizing ITA tasks for simulating circuit partitions 125, according to various embodiments. For the sake of added clarity, the method 600 is described in context of the system 100 of FIG. 1, the circuit 300 of FIG. 3, and the timing diagram 500 of FIG. 5. However, it will be appreciated that inventive aspects of the method 600 are not limited to the context provided, and the context should not be construed as limiting embodiments of the method 600.

Embodiments of the method 600 begin at block 604 when a circuit is partitioned into a number of circuit partitions 125. For example, partitioning module 120 of FIG. 1 partitions the circuit 300 of FIG. 3 into four circuit partitions 125 according to channel-connected regions. The ITA module 130 may then begin to perform an iterative timing analysis of the circuit 300 according to the circuit partitions 125. According to ITA techniques, for each integration time step 405, the ITA module 130 iteratively calculates solved conditions for at least some of the circuit partitions 125 according to conditions of that integration time step 405 until a convergence threshold is reached.

Prior to and/or during the ITA processing, the parallelization module 140 makes certain determinations and implements certain functions to aid in the parallelization of ITA tasks. At block 608, a first dependency is calculated (e.g., by the parallelization module 140) indicating that an initial condition of a second circuit partition (e.g., 125*b*) at any given integration time step 405*n* depends on a solved condition of a first circuit partition (e.g., 125*a*) according to conditions of a previous integration time step 405*n*−1. At block 612, a second dependency is calculated (e.g., by the parallelization module 140) indicating that an initial condition of the first circuit partition (e.g., 125*a*) at the given integration time step 405*n* does not depend on a solved condition of the second circuit partition (e.g., 125*b*) according to conditions of the previous integration time step 405*n*−1. These determinations may indicate that the second partition is dependent on the first partition, but the first partition is independent of the second partition.

Accordingly, at block 616, a second solved condition of the first circuit partition (e.g., 125*a*) is calculated according to predicted conditions of a second integration time step 405*b* in parallel with the ITA module 130 performing ITA of the circuit 300 according to conditions of a first integration time step 405*a*. The ITA of the circuit 300 according to conditions of the first integration time step 405*a* includes calculating a first solved condition of the second circuit partition (e.g., 125*b*) as a function of a first solved condition of the first circuit partition (e.g., 125*a*) calculated according to conditions of the first integration time step 405*a*. Notably, this calculation may be performed by the parallelization module 140 (e.g., on its own or by directing operation of the ITA module 130 to make the calculation).

Figure 7:
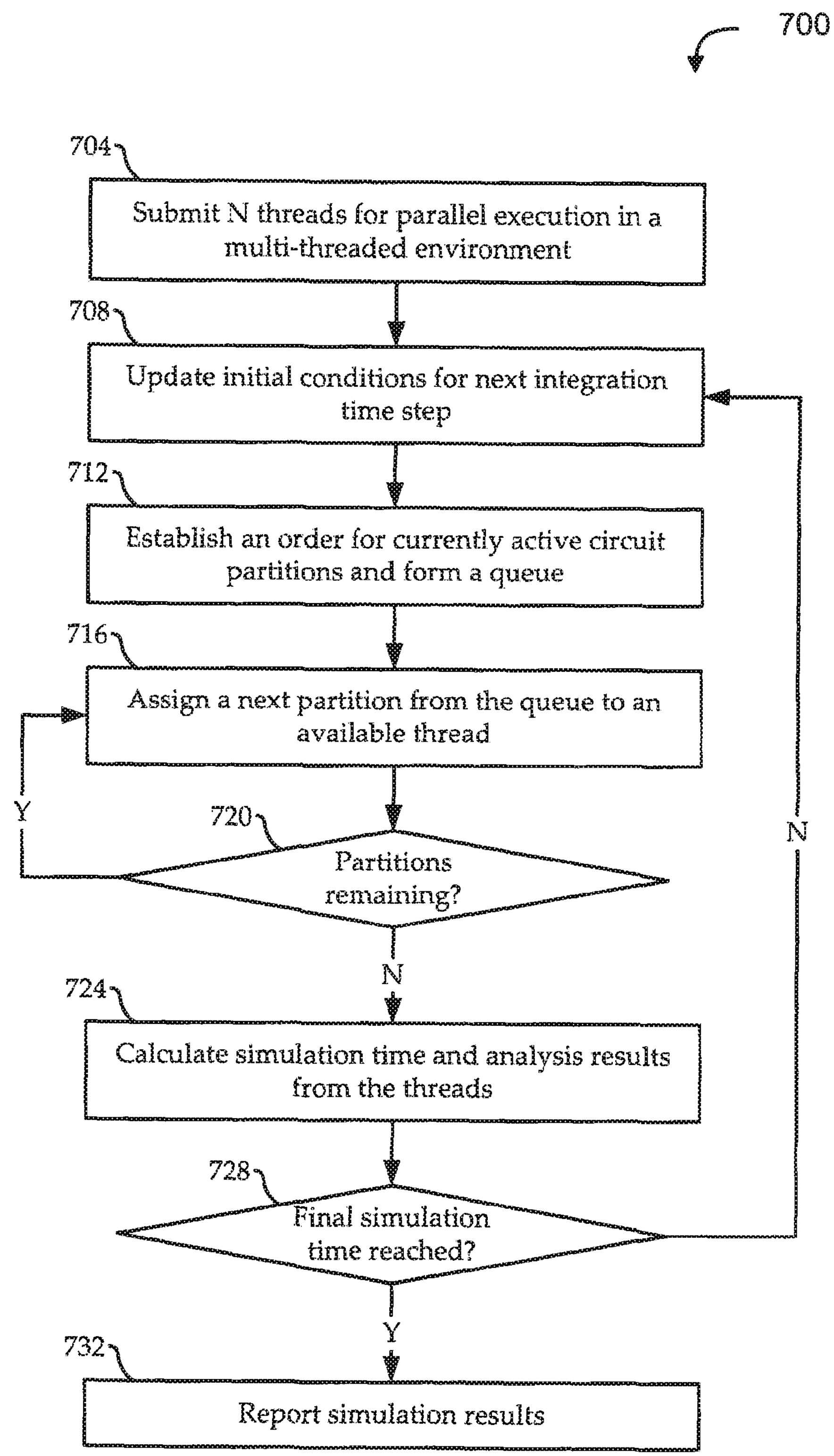
FIG. 7 shows another flow diagram of a method for parallelizing ITA steps for simulating a partitioned circuit, according to various embodiments.

Another flow diagram of a method 700 for parallelizing ITA steps for simulating a partitioned circuit, according to various embodiments, is shown in FIG. 7. The method 700 begins at block 704 by submitting a number (N) of threads for parallel execution in a multi-threaded environment. For example, multiple hardware threads or software threads may be used with one or more cores of a CPU (e.g., CPU 205 of FIG. 2).

The ITA may then proceed over multiple integration time steps 405. At block 708, some or all initial conditions are updated for a next integration time step. For example, the initial conditions include values of all independent voltage and current sources for the integration time step 405 and/or any other values on which a given partition may depend. In some cases, some or all of the initial conditions are calculated (e.g., solved), while in other cases, some or all of the initial conditions are predicted (e.g., extrapolated from values at previous integration time steps 405).

At block 712, an order is established for currently active circuit partitions and a queue is formed. In some embodiments, the order is constant over all integration time steps 405; while in other embodiments, the order is determined for each integration time step 405. For example, depending on which independent sources change over which integration time step 405, when certain solutions from previous integration time steps 405 are available for certain circuit partitions 125, etc., it may be desirable to change the order for different integration time steps 405.

The partitions may then be assigned according to the order (e.g., from the queue) to each next available thread at block 716. As illustrated, some embodiments determine at block 720 whether partitions remain to be assigned. If partitions remain unassigned at block 720, the method 700 may iterate to block 716 until all partitions are assigned to threads or until no threads remain for assignment.

As the ITA proceeds for the threads over the integration time steps 405, the simulation time and analysis results are calculated from the threads at block 724. For example, at each integration time step 405, solutions are calculated for the circuit partitions 125 in sequence and iteratively until a convergence is reached for that circuit partition 125, and other calculations are concurrently made for some circuit partitions 125 at the subsequent integration time step 405 where possible.

At block 728, a determination is made as to whether the final simulation time has been reached for the circuit analysis. While the final simulation time has not been reached, the method 700 may iterate through the remaining integration time steps 405. For example, the method 700 may return to block 708 and update some or all initial conditions for the next subsequent integration time step. If it is determined at block 728 that the final simulation time has been reached, the simulation may be complete. In some embodiments, the results of the simulation are output at block 732.

It will be appreciated that the circuit 300 of FIG. 3 is relatively simple in both its size and complexity. Other circuits may be appreciably more complex due, for example, to increased numbers and/or types of components, increased numbers and/or types of connections between components, increased numbers and/or types of sources, etc. Embodiments handle these complexities in various ways. Examples of techniques for handling certain complexities according to various embodiments are discussed with reference to FIGS. 8-11 below.

Figure 8:
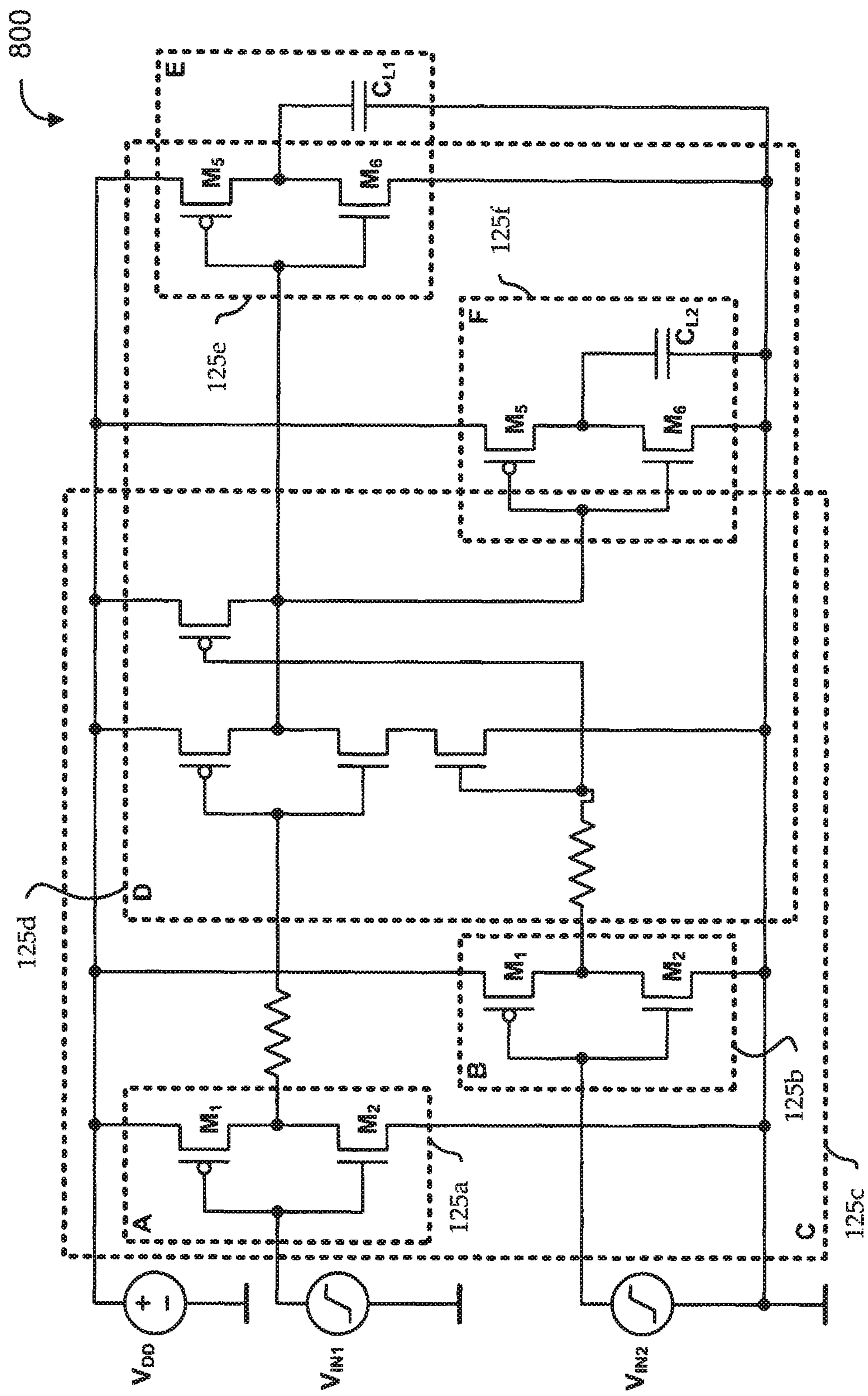
FIG. 8 shows a schematic diagram of an illustrative circuit having multiple independent sources.

Turning to FIG. 8, a schematic diagram is shown of an illustrative circuit 800 having multiple independent sources. As illustrated, the circuit 800 has been partitioned into six partitions according to channel-connected regions of the MOSFET devices of the circuit 800. As illustrated, circuit partition C 125*c* depends on circuit partition A 125*a* and circuit partition B 125*b*, and circuit partition E 125*e* and circuit partition F 125*f* both depend on circuit partition D 125*d*. In some embodiments, partition dependencies are identified and stored as a graph based on the circuit topologies before the simulation starts, and the dynamic events queue is updated at each integration time step 405 based on the actual signal activities.

Figure 9:
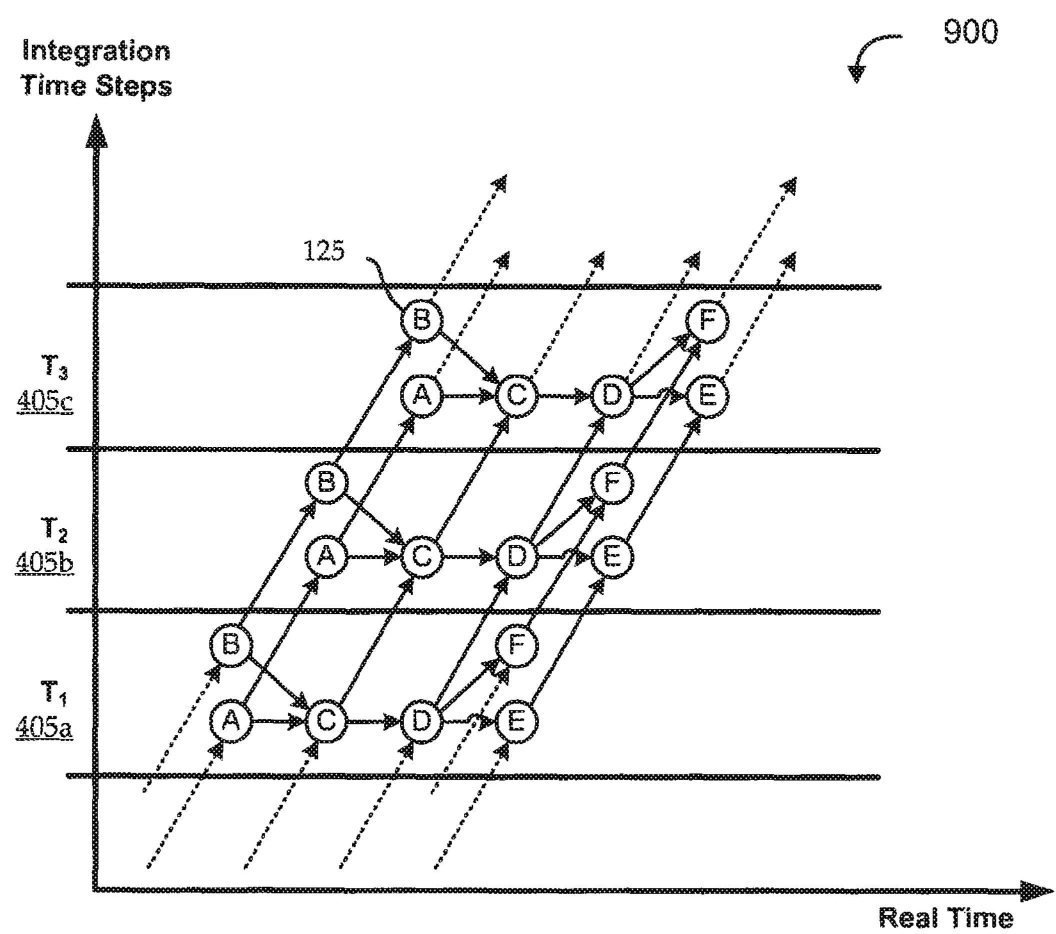
FIG. 9 shows a timing diagram in which a partition dependency graph is used to parallelize solutions of partitions based on independent sources in addition to parallelizing other ITA steps.
Figure 10:
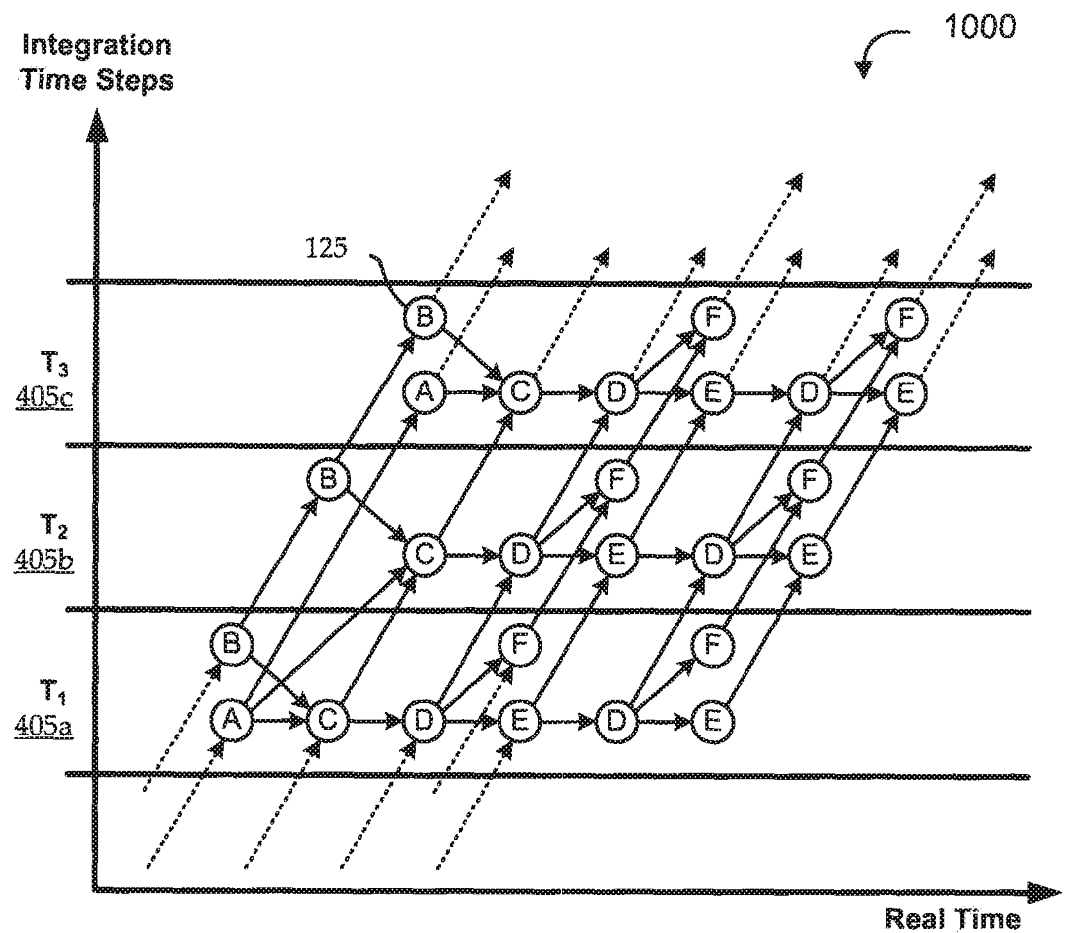
FIG. 10 shows a timing diagram in which the circuit of FIG. 8 is analyzed with certain assumptions.
Figure 11:
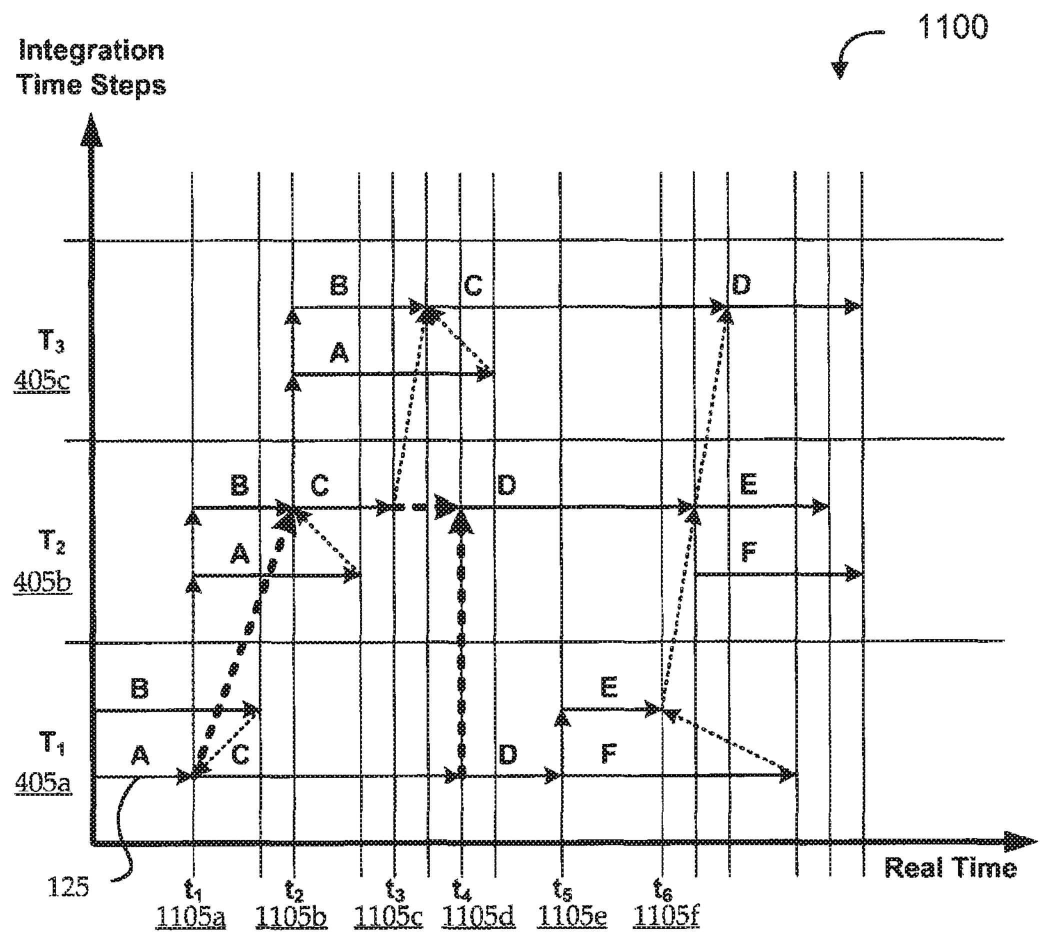
FIG. 11 shows another timing diagram that illustrates extrapolation and synchronization time points, according to various embodiments.

Different illustrative scenarios for analyzing the circuit 800 of FIG. 8 are shown by the timing diagrams of FIGS. 9-11. Turning first to FIG. 9, a timing diagram 900 is shown in which a partition dependency graph is used to parallelize solutions of partitions based on independent sources in addition to parallelizing other ITA steps. For example, as described above, parallel steps are assigned according to a sequence to a queue, and from the queue to multiple threads of a multi-threaded environment.

As illustrated, partitions A and B are solved in parallel for each integration time step 405 prior to solving partition C for that integration time step 405. Additionally, because the solutions to partitions A and B are independent of the solution to partition C, partitions A and B are solved in parallel for the subsequent integration time step 405 concurrently with solving partition C for the current integration time step 405. Similarly, partitions E and F are solved in parallel for each integration time step 405 after solving partition D for that integration time step 405, and partition D can be solved for the subsequent integration time step 405 concurrently with solving partitions E and F for the current integration time step 405. Notably, during the relaxation procedure, some partitions may have to be analyzed more than one time, in order to meet the convergence criteria. Also, some partitions can be temporary suspended because of inactivity (e.g., slow changing signals at the inputs) or for other reasons.

For example, FIG. 10 shows a timing diagram 1000 in which the circuit 800 of FIG. 8 is analyzed assuming that partition A as inactive at the second integration time step 405*b*, and partition D is determined to require re-analysis at the first integration time step 405*a*. As partitions E and F depend on partition D, partitions E and F are included in the events queue at subsequent integration time steps 405 as long as those partitions remain active. This is true even if they are inactive at the current time, since re-analysis of partition D may affect the solutions of partitions E and F, so that they also must be re-analyzed.

The timing diagram 1000 also shows partition A being inactive for the second integration time step 405*b*. According to some embodiments, the smallest time step is found for the circuit. For example, the smallest time step is the time step over which the fastest changing source is active. For each integration time step 405, the order (e.g., queue) is established at least in part based on which sources are active for that integration time step 405. For example, partitions A and B are solved in parallel prior to solving partition C, but only for integration time steps 405 in which partition A is active (e.g., where its value changes). As illustrated, at the second integration time step 405*b*, the solution for partition A from the first integration time step 405*a* is used, rather than re-calculating it for the second integration time step 405*b*.

Typically, the integration time step 405 is selected across the circuit based on the signal activities and a history of the few previous integration time steps 405, such that smaller steps are selected for fast-switching signals. Partitions may have different signal rates and therefore different integration time steps may be selected. This can be referred to as multi-rate simulation. In order to propagate a state solution between partitions at desired time points, the results obtained within individual partitions may have to be synchronized across all partitions. To ensure the accuracy, then, the smallest time step may be selected across all partitions in some implementations, and the time step may be cut for all remaining partitions states to match the selection point.

In some cases, it is difficult or impossible to accurately predict the time step before an analysis of all partitions is completed. Some embodiments establish virtual synchronization points. According to these embodiments, a state solution from one partition is delivered to other partitions on demand. Some implementations use extrapolation, where necessary, to aid in providing this functionality.

FIG. 11 shows another timing diagram 1100 that illustrates extrapolation and synchronization time points, according to various embodiments. The timing diagram 1100 assumes that there is a dependency between partition D and partition C. For example, consider that partition C is solved at a first runtime point 1105 (i.e., a point in real time during the simulation) and partition D is solved at a second runtime point 1105 that is subsequent to the first runtime point 1105. In this case, the solution state of partition C is delivered to partition D in time for the solution to partition D to be calculated, and the ITA can proceed according to traditional techniques. Alternatively, suppose that the second runtime point 1105 were to occur prior to the first runtime point. In this alternative case, partition C still does not have an exact solution when it is time to solve partition D. Embodiments extrapolate a previous solution to partition C for use in calculating partition D.

The extrapolation accuracy may depend on various factors. One such factor may be the length of the extrapolation range. For example, a very short extrapolation may suggest that very few changes have occurred in the meantime. Another such factor may be how strongly or weakly partition D depends on partition C (e.g., and/or other intermediate occurrences). Some embodiments consider partitions as weakly or strongly dependent based on the actual strength of state dependencies between the neighbor partitions. When the circuit is divided according to channel connected regions, MOSFET devices at the partition boundaries contribute to the dependencies in most cases. It may be unnecessary to consider certain other types of components in determining dependencies. For example, coupling capacitors may be ignored, so that partitions with coupling capacitors can be considered merged into a single partition.

In some embodiments, the criteria for dependency is established according to MOSFET device transconductance ($di_{DS}/dV_{GS}$). A stronger dependency indicates that the drain current is more sensitive to gate voltage variations, as indicated by a higher transconductance value. Smaller values may typically be achieved when a device is in a sub-threshold, cutoff, or weak inversion region (i.e., $V_{GS}<V_{TH}$). Otherwise, in the device linear region it can be assumed in certain embodiments that the dependency is always strong. For example, in the saturation region, dependency strength can be calculated according to the following:

$$di_{DS}/dV_{GS}=2i_D/(V_{GS}-V_{TH}).$$

It will be appreciated that extrapolation over even an extended time range will be substantially accurate if there is a weak enough dependency present for all devices across the boundary of a given partition. If a significant error occurs as a result of extrapolation, state rollback can be performed in a subsequent iteration. In some cases, when a dependency is determined to be too strong, extrapolation may not be possible, and embodiments may wait until the actual states of neighbor partition(s) become available before calculating a strongly dependent partition.

For example, as illustrated in FIG. 11, when it is time to calculate partition C at the second integration time step 405*b* (i.e., illustrated at runtime point 1105*b*), the solution to partition C from the first integration time step 405*a* is not yet available. It is determined that a previous solution to partition C (e.g., the solution that is being used to establish the initial condition for solving partition C at the first integration time step 405*a*, illustrated at runtime point 1105*a*) is extrapolated for use in the second integration time step 405. However, it is assumed that partition D is strongly dependent on partition C. Accordingly, the simulation waits for the solution to partition C at the first integration time step 405*a* to become available prior to proceeding with solving for partition D at the second integration time step 405*b* (i.e., illustrated as a wait time between runtime point 1105*c* and 1105*d*).

It will be appreciated that embodiments may be appreciably affected by the number of partitions, their size, the number of integration steps during simulation, the number of iterations required for partitions to converge, the number of available threads, etc. Suppose that there are N partitions of relatively similar large size, L iterations (L<N) required on average to reach convergence, and M integration steps (M>>N) are required to complete the transient analysis. Under these assumptions, traditional approaches (e.g., like the approach illustrated in FIG. 4) may have an estimated runtime complexity (O) of O(M*L*N). Using parallelization according to some of the embodiments described above, however, K available threads (K<N) can theoretically reduce runtime complexity to O((M−K)*L*N/K). In practice, certain overhead associated with the data communication between the threads and/or other factors may reduce overall performance gains. Further, additional memory may be required to store partition states and device evaluation results, and extra memory size may have a linear dependency on the size of partitions and the number of available threads. For example, with the K threads, it may be required to allocate roughly K times more memory for each state variable and device within a partition.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method for simulation of a circuit partitioned into a plurality of circuit partitions over a plurality of integration times, the method comprising:

calculating, by a computer, a first dependency indicating that an initial condition of a second circuit partition at a given integration time depends on a solved condition of a first circuit partition according to conditions of a previous integration time;

calculating, by the computer, a second dependency indicating that an initial condition of the first circuit partition at the given integration time does not depend on a solved condition of the second circuit partition according to conditions of the previous integration time; and calculating, according to the first and second dependencies and using a first hardware thread of the computer, a second solved condition of the first circuit partition according to predicted conditions of a second integration time while performing an iterative timing analysis of the circuit with the computer according to conditions of a first integration time, the iterative timing analysis comprising calculating a first solved condition of the second circuit partition as a function of a first solved condition of the first circuit partition calculated according to conditions of the first integration time, wherein at least a portion of the iterative timing analysis of the circuit according to conditions of the first integration time is performed using a second hardware thread.

2. A method for simulation of a circuit partitioned into a plurality of circuit partitions over a plurality of integration times, the method comprising:

calculating, by a computer, a first dependency indicating that an initial condition of a second circuit partition at a given integration time depends on a solved condition of a first circuit partition according to conditions of a previous integration time;

calculating, by the computer, a second dependency indicating that an initial condition of the first circuit partition at the given integration time does not depend on a solved condition of the second circuit partition according to conditions of the previous integration time; and calculating, by the computer according to the first and second dependencies, a second solved condition of the first circuit partition according to predicted conditions of a second integration time while performing an iterative timing analysis of the circuit with the computer according to conditions of a first integration time, the iterative timing analysis comprising calculating a first solved condition of the second circuit partition as a function of a first solved condition of the first circuit partition calculated according to conditions of the first integration time; and performing an iterative timing analysis of the circuit according to conditions of the second integration time by calculating a second solved condition of the second circuit partition as a function of the second solved condition of the first circuit partition calculated according to the predicted conditions of the second integration time and as a function of an extrapolation of an initial condition of the second circuit partition at the first integration time.

3. A computer-implemented circuit simulation system having a non-transitory medium with instructions stored thereon, which, when executed, cause the processor to implement a plurality of modules comprising:

a partitioning module configured to partition a circuit into a plurality of circuit partitions;

an iterative timing analysis module configured to performing an iterative timing analysis of the circuit according to the plurality of circuit partitions, for each of a plurality of integration times, the iterative timing analysis comprising iteratively calculating solved conditions for at least some of the plurality of circuit partitions according to conditions of the integration time until a convergence threshold is reached; and a parallelization module, in communication with the iterative timing analysis module, and configured to:

calculate a first dependency indicating that an initial condition of a second circuit partition at a given integration time depends on a solved condition of a first circuit partition according to conditions of a previous integration time;

calculate a second dependency indicating that an initial condition of the first circuit partition at the given integration time does not depend on a solved condition of the second circuit partition according to conditions of the previous integration time; and calculate a second solved condition of the first circuit partition according to the first and second dependencies and according to predicted conditions of a second integration time in parallel with the iterative timing analysis module performing an iterative timing analysis of the circuit according to conditions of a first integration time, the iterative timing analysis of the circuit according to conditions of the first integration time comprising calculating a first solved condition of the second circuit partition as a function of a first solved condition of the first circuit partition calculated according to conditions of the first integration time.

4. The system of claim 3, wherein the circuit is a MOSFET-dominated circuit and the partitioning module is configured to partition the circuit into the plurality of circuit partitions by decomposing the circuit into channel-connected regions.

5. The system of claim 3, wherein the parallelization module is further configured to:

assign the calculating of the second solved condition of the first circuit partition to a first hardware thread; and assign at least a portion of the iterative timing analysis of the circuit according to conditions of the first integration time to a second hardware thread.

6. The system of claim 3, wherein the parallelization module is configured to calculate the first dependency by calculating that a dependency strength for the second circuit partition is above a predetermined threshold level.

7. The system of claim 3, wherein the iterative timing analysis module is further configured to:

determine whether the predicted conditions of the second integration time are verified according to final conditions of the first integration time subsequent to completing the iterative timing analysis of the circuit according to the conditions of the first integration time.

8. The system of claim 7, wherein the iterative timing analysis module is further configured to:

perform an iterative timing analysis of the circuit according to conditions of a second integration time comprising calculating a second solved condition of the second circuit partition as a function of the second solved condition of the first circuit partition calculated according to the predicted conditions of the second integration time when the predicted conditions of the second integration time are verified according to final conditions of the first integration time; and perform an iterative timing analysis of the circuit according to conditions of the second integration time comprising calculating a second solved condition of the second circuit partition as a function of a third solved condition of the first circuit partition calculated according to the final conditions of the first integration time when the predicted conditions of the second integration time are not verified according to final conditions of the first integration time.

9. The system of claim 3, wherein the iterative timing analysis module is further configured to:

perform an iterative timing analysis of the circuit according to conditions of the second integration time by calculating a second solved condition of the second circuit partition as a function of an extrapolation of an initial condition of the second circuit partition at the first integration time.

10. A computer program product residing on a non-transitory, processor-readable medium and having processor-readable instructions, which, when executed, cause a multi-threaded processor to perform steps comprising:

calculating a first dependency indicating that an initial condition of a second circuit partition at a given integration time depends on a solved condition of a first circuit partition according to conditions of a previous integration time;

calculating a second dependency indicating that an initial condition of the first circuit partition at the given integration time does not depend on a solved condition of the second circuit partition according to conditions of the previous integration time; and calculating a second solved condition of the first circuit partition according to the first and second dependencies and according to predicted conditions of the second integration time while performing an iterative timing analysis of the circuit according to conditions of a first integration time using a plurality of hardware threads, the iterative timing analysis comprising calculating a first solved condition of the second circuit partition as a function of a first solved condition of the first circuit partition calculated according to conditions of the first integration time.

* * * * *

UNITED STATES PATENT AND TRADEMARK OFFICE

CERTIFICATE OF CORRECTION

PATENT NO. : 8,341,577 B1
APPLICATION NO. : 13/191603
DATED : December 25, 2012
INVENTOR(S) : Korobkov et al.

It is certified that error appears in the above-identified patent and that said Letters Patent is hereby corrected as shown below:

On title page, in column 2, under "Other Publications", line 2, delete "Chung-Jung," and insert -- Chung-Jung Chen, --, therefor.

On title page, in column 2, under "Other Publications", line 7, delete "20-04," and insert -- 20-24, --, therefor.

Signed and Sealed this
Sixteenth Day of April, 2013

Teresa Stanek Rea
*Acting Director of the United States Patent and Trademark Office*